(12) United States Patent
Cowles, Jr. et al.

(10) Patent No.: US 9,909,613 B2
(45) Date of Patent: Mar. 6, 2018

(54) COMPRESSION ROD HAVING A BUCKLING INITIATING FEATURE

(71) Applicant: Roller Bearing Company of America, Inc., Oxford, CT (US)

(72) Inventors: John H. Cowles, Jr., Unionville, CT (US); James Beavers, Seneca, SC (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/686,413

(22) Filed: Apr. 14, 2015

(65) Prior Publication Data

US 2015/0292549 A1 Oct. 15, 2015

Related U.S. Application Data

(60) Provisional application No. 61/979,760, filed on Apr. 15, 2014.

(51) Int. Cl.
*F16C 7/02* (2006.01)
*B64C 13/30* (2006.01)

(52) U.S. Cl.
CPC ............... *F16C 7/02* (2013.01); *B64C 13/30* (2013.01); *F16C 2326/43* (2013.01)

(58) Field of Classification Search
CPC .................... F16C 7/02; B64C 13/30
See application file for complete search history.

(56) References Cited

U.S. PATENT DOCUMENTS

| 3,430,541 | A | 3/1969 | Seamands et al. |
| 4,156,997 | A * | 6/1979 | Decker ............... F16S 3/00 52/223.6 |
| 4,334,693 | A | 6/1982 | Huber |
| 4,361,212 | A | 11/1982 | Bolang et al. |
| 4,433,224 | A | 2/1984 | Kitchen |
| 5,065,976 | A | 11/1991 | Woody |
| 5,181,589 | A | 1/1993 | Siegner et al. |
| 6,298,962 | B1 | 10/2001 | Kato et al. |
| 8,161,619 | B2 | 8/2012 | Wanthal |
| 8,808,488 | B2 * | 8/2014 | Nogues ............. B29C 70/52 156/244.13 |

(Continued)

FOREIGN PATENT DOCUMENTS

| DE | 4413636 A1 | 10/1995 |
| DE | 102013004010 A1 * | 9/2014 ............ B60G 7/001 |

(Continued)

OTHER PUBLICATIONS

Extended European Search Report for EP15163639.6-1751, dated Sep. 29, 2015.

(Continued)

*Primary Examiner* — Vicky A Johnson
(74) *Attorney, Agent, or Firm* — Murtha Cullina, LLP

(57) ABSTRACT

A compression rod has a buckling initiating feature. The compression rod includes an elongate body. The elongate body has a first cross sectional area along a first a length of the elongate body and a second cross sectional area along a second length of the elongate body. The second cross sectional area defines the buckling initiating feature. The second cross sectional area is configured to cause buckling along the elongate body upon application of a predetermined axially oriented compressive force.

11 Claims, 10 Drawing Sheets

(56) References Cited

U.S. PATENT DOCUMENTS

| | | | |
|---|---|---|---|
| 2010/0196637 A1* | 8/2010 | Lippert | ................ B29C 70/345 |
| | | | 428/36.1 |
| 2010/0278586 A1* | 11/2010 | Cavaliere | ................ B29C 65/56 |
| | | | 403/119 |
| 2012/0132493 A1 | 5/2012 | Bonnet et al. | |

FOREIGN PATENT DOCUMENTS

| | | |
|---|---|---|
| EP | 1291545 B1 | 8/2005 |
| EP | 1870318 A1 | 12/2007 |
| EP | 1125829 B1 | 4/2010 |
| JP | 2501151 Y2 | 6/1996 |
| JP | 4245560 B2 | 3/2009 |
| JP | 2013210074 A | 10/2013 |
| JP | 2014527596 A | 10/2014 |
| WO | 2008106916 A1 | 9/2008 |
| WO | 2014174262 A1 | 10/2014 |

OTHER PUBLICATIONS

EP Communication issued in corresponding EP Application No. 15 163 639.6, dated May 15, 2017, pp. 1-5.

* cited by examiner

FIG. 8A
FIG. 8B
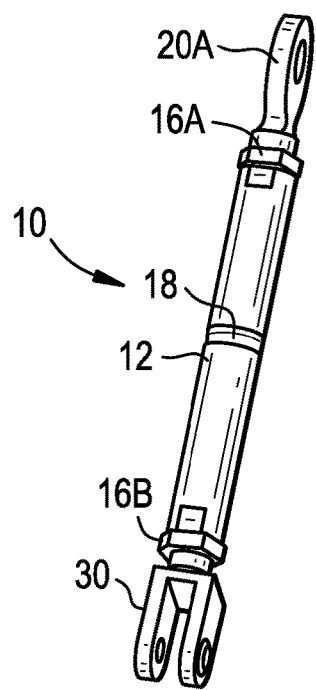
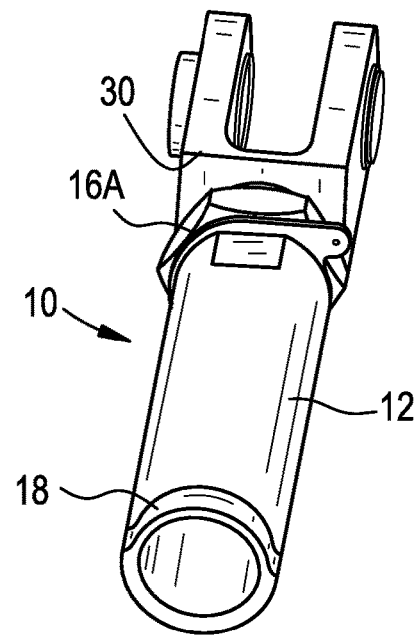

FIG. 9A
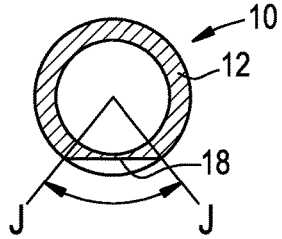
FIG. 9B  FIG. 9C  FIG. 9D
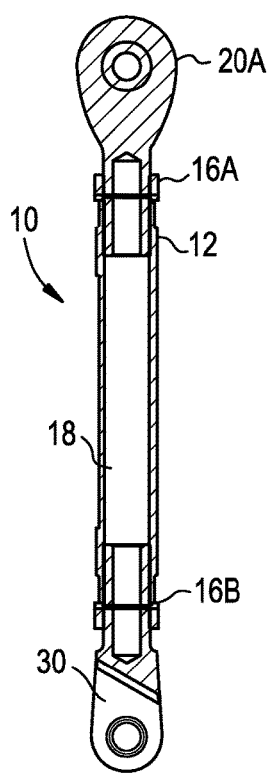 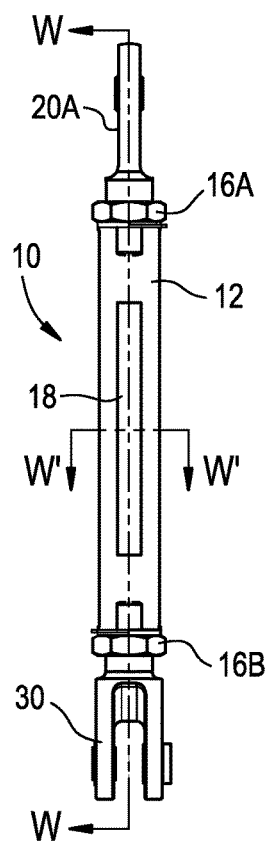 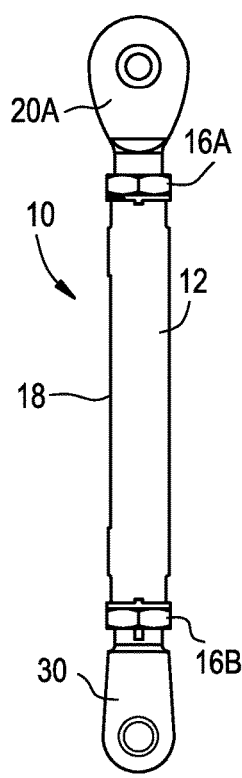
FIG. 9E
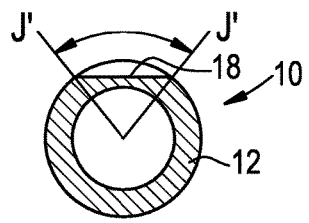

COMPRESSION ROD HAVING A BUCKLING INITIATING FEATURE

CROSS REFERENCE TO RELATED APPLICATION

This application claims the benefit of U.S. Provisional Patent Application Ser. No. 61/979,760, filed on Apr. 15, 2014, which is incorporated herein by reference in its entirety.

FIELD OF THE INVENTION

The present invention relates generally to a compression rod, and more specifically to a compression rod having a buckling initiating feature that is used to more precisely control the load at which the compression rod fails when frictional bearings are used at each end of the rod.

BACKGROUND OF THE INVENTION

A compression rod is a type of mechanical linkage that is configured to deform upon application of a predetermined force. Compression rods are often used in such applications as fixed wing and rotary wing aircrafts, wherein compression rods are used to connect control devices that enable the aircraft to be maneuvered. Buckling is a phenomenon in compression rods whereby a mechanical structure deforms under axial, compressive loading, but because of the deformation there is a critical load beyond which the rod cannot carry additional load. If friction is introduced by bearings positioned at each end of the rod, the rod can hold a higher load than the predicted critical buckling load until the static frictional force is overcome. When the static frictional force is overcome, buckling commences, and the load immediately drops to the predicted critical buckling load, wherein large deformations are evident.

When a predetermined, axially oriented force is applied to a compression rod, buckling generally needs to be avoided in order for the rod to carry the load safely. Such avoidance is accomplished by increasing the area of the rod's cross-section, thereby increasing the weight of the rod. There are times, however, when, to prevent damage to more expensive components that the compression rod is coupled to the less expensive compression rod is sacrificed. In this case, the compression rod must safely carry the required loads, but if loads become higher than a maximum limit, the rod buckles to protect the attached component from experiencing loads beyond a threshold, as such loads would cause irreparable damage.

The critical load that causes buckling is calculated for a compression member for the case of frictionless ends (i.e. cannot support moments). The critical load that causes buckling, $F_{crit}$, is given by the equation $$F_{crit} = \frac{\pi EI}{(KL)^2},$$

wherein E is equal to the modulus of elasticity of the compression rod, I is equal to the second moment of inertia of the compression rod, L is equal to the length between the centers of the bearings, K is equal to 1.0 for hinged ends wherein friction does not exist and to 0.5 for situations wherein both ends are fixed (i.e., bearings are locked), r is equal to the radius of gyration and is defined by $$\sqrt{\frac{I}{A}}$$

wherein A is equal to cross sectional area. The slenderness ratio is defined by L/r. Compression rods having a slenderness ratio above 200 are said to be long and/or slender. Compression rods having a slenderness ratio between 50 and 200 are said to be an intermediate length.

When bearings are positioned on ends of the compression rod, the critical load that causes buckling is difficult to predict. Many factors, including the eccentricity of the point of load application to the center of the rod's cross-section, influence the load at which the compression rod will fail. Even between two similar compression rods with similar frictional bearings on each end, the load at which each fails may be drastically different from the predicted failure load. In addition, similar compression rods with frictional bearings tend to lack repeatable actual failure loads. Those skilled in the relevant art have long sought, but have been unable to arrive at, a compression rod that consistently fails within a narrow range of the predicted failure load for the compression rod.

SUMMARY

In one aspect, the present invention resides in a compression rod having a buckling initiating feature. The compression rod includes an elongate body. The elongate body has a first cross sectional area along a first length of the elongate body and a second cross sectional area along a second length of the elongate body. The buckling initiating feature is defined, in part, by the second cross sectional area. The second cross sectional area is configured to cause predetermined buckling along the elongate body upon application of a predetermined axially oriented compressive force. Predetermined buckling occurs when, upon application of a predetermined axially oriented compressive force, the elongate body buckles as predicted.

In one embodiment, the compression rod has a baseline slenderness ratio of greater than 200. In one embodiment, the compression rod has a baseline slenderness ratio between 50 and 200.

In one embodiment, the second length comprises a surface depression extending axially therealong. In one embodiment, the axially extending surface depression has a substantially flat base portion. In one embodiment, the axially extending surface depression has a substantially concave base portion. In one embodiment, the second length comprises a transversely extending surface depression. In one embodiment, the transversely extending surface depression has a substantially concave base portion. In one embodiment, the transversely extending base portion extends approximately 180 degrees around a cylindrical outer surface of the elongate body.

DESCRIPTION OF THE DRAWINGS

FIG. 8A is a perspective view of the compression rod having a buckling initiating feature of FIG. 1A, wherein the buckling feature includes a surface depression extending partially circumferentially around the compression rod;

FIG. 8B is a perspective view of a portion of the compression rod having a buckling initiating feature of FIG. 8A;

FIG. 9A is a transverse cross sectional view of the compression rod of FIG. 5A cut across the line W'-W' of FIG. 9C;

FIG. 9B is a longitudinal cross sectional view of the compression rod of FIG. 5A cut across the line W-W of FIG. 9C;

FIG. 9C is a front view of the compression rod of FIG. 5A;

FIG. 9D is a side view of the compression rod of FIG. 5A;

FIG. 9E is a transverse cross sectional view of the compression rod of FIG. 5A cut across the line W'-W' of FIG. 9C, wherein the buckling initiating feature is in an alternative position;

DETAILED DESCRIPTION OF THE PREFERRED EMBODIMENT

Figure 1A:
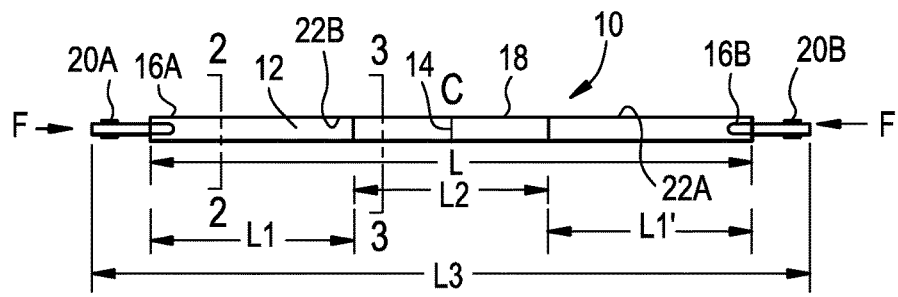
FIG. 1A is a front view of a compression rod having a buckling initiating feature of the present invention.

As shown in FIG. 1A, a compression rod is generally designated by the numeral 10. The compression rod 10 includes an elongate body 12 (e.g., a hollow tubular body) having a total length L. A first length L1 and L1', a second length L2 and a center 14 are defined along the total length L. In the embodiment of FIG. 1A, the center 14 is positioned equidistant from axially opposite ends 16A and 16B of the elongate body 12 and defines a plane C which extends therethrough. The second length L2 defines a buckling initiating feature 18, for example anasymmetrically positioned (e.g., present on one portion of the compression rod but not on an opposite side thereof) buckling feature as shown in FIGS. 1A, 3, 4, 5A, 5B, 6A, 6B, 7A, 7B, 8A, 8B, 9A-9E, 10A-10E, 11A-11E, and 12A-12E. It is not required that this surface be centered on the elongate body, but if it is not centered on the elongate body, the rod will deform less predictably. The buckling initiating feature 18 is configured to cause predetermined buckling along the elongate body upon application of a predetermined axially oriented compressive force. Predetermined buckling occurs when, upon the application of the predetermined axially oriented compressive force, the elongate body 12 buckles as predicted. As shown in FIG. 1A, the compression rod 10 includes two rod ends 20A and 20B secured thereto, as discussed further herein. The elongate body 12 defines a generally cylindrical outer surface 22A and a cylindrical inner surface 22B. Although the compression rod 10 is described as being hollow, the present invention is not limited in this regard, as a solid compression rod 10 may be used without departing from the broader aspects of the present invention.

Figure 2:
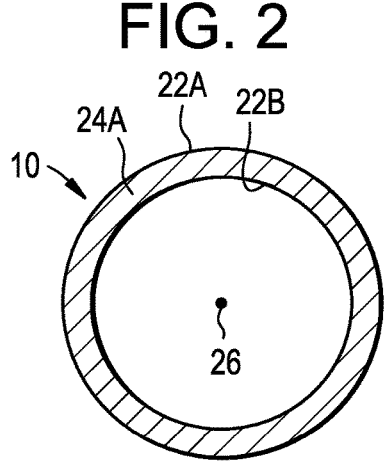
FIG. 2 is a transverse cross sectional view of the compression rod of FIG. 1A taken across the line 2-2.

Referring to FIG. 2, the elongate body 12 has a first cross sectional area 24A defined by a first outer diameter. The first cross sectional area 24A and the first outer diameter are present along a first axially oriented axis 26 and along the first length L1 and L1'. A predetermined axially oriented force F is applied along the first axially oriented axis 26. The buckling initiating feature 18 defines a second cross sectional area 24B. The second cross sectional area 24B is present along the second length L2. The second cross sectional area 24B is asymmetric and has less area than the first cross sectional area 24A. The second cross sectional area 24B is configured to cause buckling along the elongate body 12 upon application of the predetermined, axially oriented compressive force F. In one embodiment, as shown in FIG. 2, the axially oriented compressive force F is distributed about the first cross sectional area 24A such that a resultant load transmission (i.e., load path) axis is coaxial with the first axially oriented axis 26.

The compression rod 10, illustrated in FIG. 1A, has a baseline slenderness ratio. The baseline slenderness ratio is a function of length and radius of gyration of the compression rod 10. In one embodiment, the baseline slenderness ratio is between 50 and 200. In one embodiment, the baseline slenderness ratio is greater than 200. A compression rod with a baseline slenderness ratio between 50 and 200 that has no buckling initiating feature will fail by buckling. However, the failure load would have significantly more scatter (i.e., inconsistency) than would a rod with slenderness ratio of greater than 200 to which such a load was applied. A compression rod with a baseline slenderness ratio less than 50 that has no buckling initiating feature will likely fail by direct compression rather than by buckling.

Figure 1B:
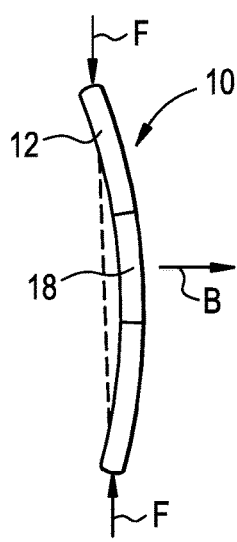
FIG. 1B is a schematic view of the compression rod of FIG. 1A, shown in a buckled condition.
Figure 1C:
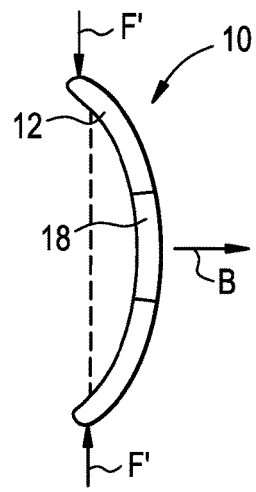
FIG. 1C is a schematic view of the compression rod of FIG. 1A, shown in a buckled condition.
Figure 3:
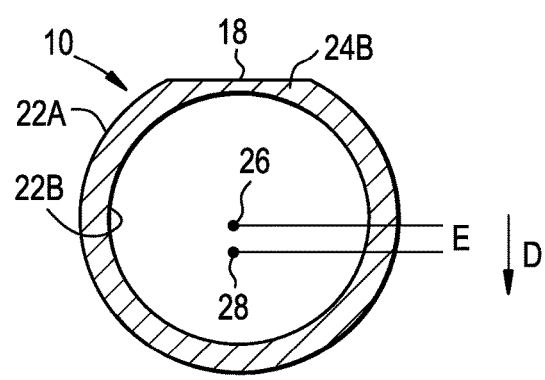
FIG. 3 is a transverse cross sectional view of one embodiment of a compression rod having a buckling initiating feature taken across the line 3-3.

In one embodiment, as shown in FIG. 3, the second cross sectional area 24B causes an eccentricity E between the first axially oriented axis 26 and a second axially oriented axis 28. The second axially oriented axis 28 is defined by the centroid of the second cross sectional area 22B extending along the length L2. As shown in FIG. 3, the first axially oriented axis 26 and the second axially oriented axis 28 are separated by the eccentricity E. The buckling initiating feature 18 causes the eccentricity E in a direction D, as a result of the second cross sectional area 24B being asymmetric and less than the first cross sectional area 24A. The eccentricity E between the first axially oriented axis 26 and the second axially oriented axis 28 increases the propensity of the compression rod 10 to fail predictably in buckling as shown, for example, in FIG. 1B. The buckling initiating feature 18 is configured to cause the buckling before plastic axial compression of the elongate body 12. As shown in FIG. 1B, upon application of the compressive forces F to the compression rod 10, when the compressive forces F reach a first predetermined magnitude, the compression rod 10 buckles so that a portion of the compression rod 10 (e.g., a central portion or portion having the buckling initiation feature 18 therein) elastically buckles traversely in the direction of the arrow B. When the force F is of a first predetermined magnitude the buckling is in an elastic range so that when the force F is removed the compression rod 10 elastically returns to an initial state as shown in FIG. 1A. When the force F' is increased to a second predetermined magnitude, greater than the first predetermined magnitude, the compression rod 10 plastically buckles in the transverse direction indicated by the arrow B, as shown in FIG. 1C. After removal of the force F' the compression rod 10 remains traversely buckled. Eccentricity E is created in a compression rod 10 without altering the load application points via the buckling initiating feature 18. The compression rod 10 has a greater strength in tension than in compression. Compression rods may be easily retrofitted with the buckling initiating feature 18.

The eccentricity E between the first axially oriented axis 26 and the second axially oriented axis 28 increases the propensity for buckling of the elongatebody 12. This increased propensity for buckling of the elongate body 12 overcomes the friction in the frictional bearings in a consistent way. In one embodiment, the eccentricity E causes the axially oriented compressive force at which buckling occurs along the elongate body 12 to be within 5% of a predicted (e.g., analytically calculated) force at which buckling is predicted to occur when there is no friction on each end.

In one embodiment, the degree of the eccentricity E between the first axially oriented axis 26 and the second axially oriented axis 28 is approximately 0.020 to 0.030 inches where the outer diameter of the elongate body 12 along the first length L1 and L1' is 0.625 inches (e.g., 3.2 to 4.8% of the outer diameter). Although in one embodiment, the degree of the eccentricity E between the first axially oriented axis 26 and the second axially oriented axis 28 is 0.025 inches or 4.0% of the outer diameter, the present invention is not limited in this regard, as any suitable degree of eccentricity may be used, and greater degrees of eccentricity result in greater predictability regarding the onset of buckling, for example, when the elongate body is supported by frictional bearings.

As shown in FIG. 1A, the buckling initiating feature 18 is positioned substantially equidistant from the opposing ends 16A and 16B of the elongate body 12 and symmetric about the plane C. In one embodiment, the buckling initiating feature 18 is positioned so that at a portion thereof extends axially through the plane C and is asymmetric thereto. However, the present invention is not limited in this regard, as the buckling initiating feature may be positioned so that no portion thereof extends axially through the plane C defined by the center 14 of the elongate body 12, for example an asymmetrically positioned buckling initiation feature 18.

Figure 4:
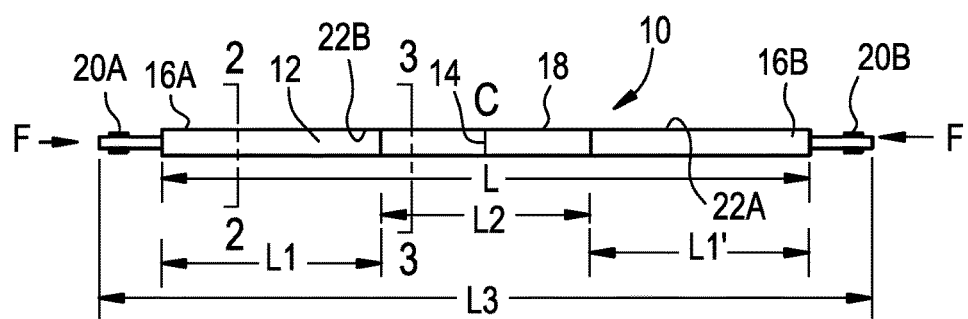
FIG. 4 is a front view of the compression rod having a buckling initiating feature of the present invention, wherein axially opposite rod ends are integral with the compression rod.

In one embodiment, as shown in FIG. 1A, the compression rod 10 includes a rod end 20A and 20B positioned on each of two axially opposite ends 16A and 16B of the elongate body 12. Frictional bearings are included in rod ends 20A and 20B. However, the present invention is not limited in this regard, as the compression rod may include one rod end 20A and 20B positioned on one end 16A and 16B of the elongate body 12, or may include no rod ends positioned on the ends 16A and 16B of the elongate body 12. As shown in FIG. 1A, the rod ends 20A and 20B are threaded to the compression rod 10. As shown in FIG. 4, the rod ends 20A and 20B are integral with the compression rod 10.

Figure 6A:
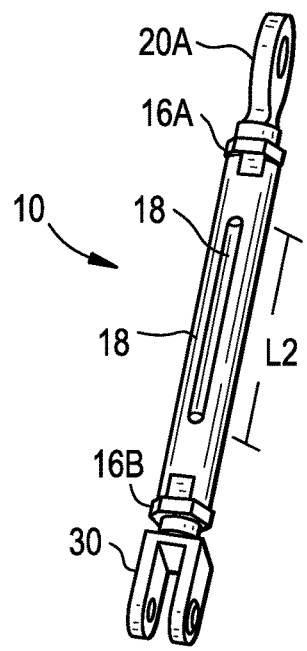
FIG. 6A is a perspective view of the compression rod having a buckling feature of the present invention, wherein the buckling feature includes an axially extending surface depression having a substantially concave base portion.
Figure 6B:
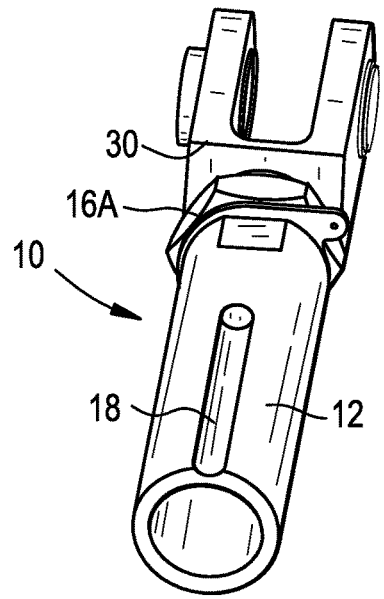
FIG. 6B is a perspective view of a portion of the compression rod having a buckling initiating feature of FIG. 6A.
Figure 7A:
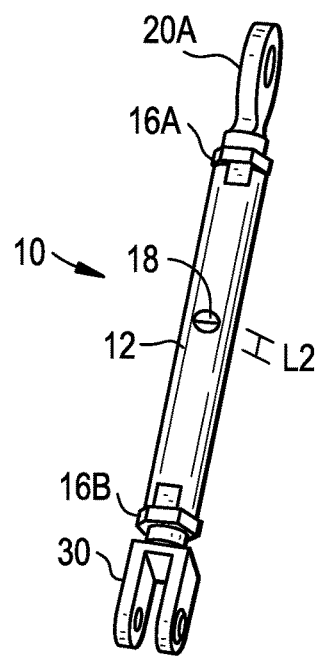
FIG. 7A is a perspective view of the compression rod having a buckling initiating feature of FIG. 1A, wherein the buckling feature includes a transversely extending surface depression having a substantially concave base portion.
Figure 7B:
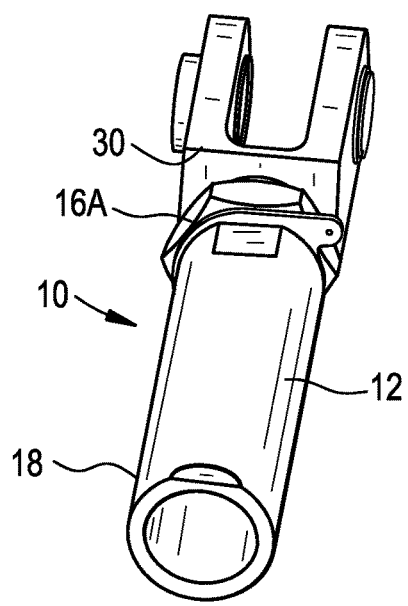
FIG. 7B is a perspective view of a portion of the compression rod having a buckling initiating feature of FIG. 7A.

Similarly, in another embodiment, the compression rod 10 includes a clevis joint 30 positioned on each of two axially opposite ends 16A and 16B of the elongate body 12. However, the present invention is not limited in this regard, as the compression rod may include the clevis joint 30 positioned on only one end 16A and 16B of the elongate body 12, as shown in FIG. 6B. In one embodiment, the clevis joints 30 are threaded to the compression rod 10. In an alternative embodiment, the clevis joints 30 are integral with the compression rod 10.

Figure 5A:
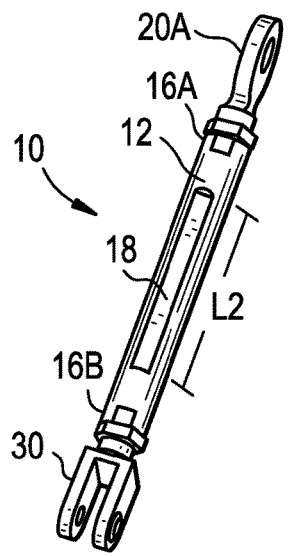
FIG. 5A is a perspective view of the compression rod having a buckling feature of the present invention, wherein the buckling initiating feature comprises an axially extending surface depression having a substantially flat base portion.
Figure 5B:
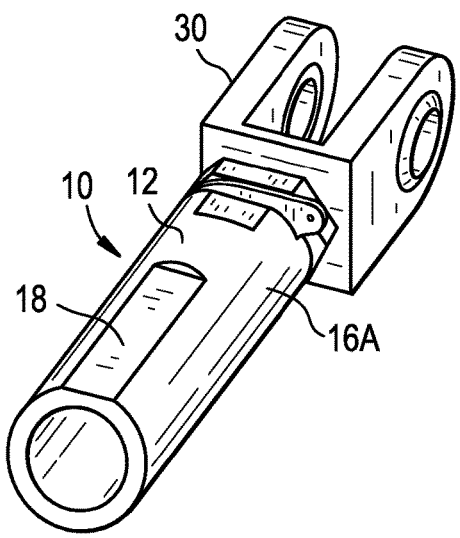
FIG. 5B is a perspective view of a portion of the compression rod having a buckling initiating feature of FIG. 5A.

In an alternative embodiment, as illustrated in FIG. 5A, the compression rod 10 includes the rod end 20A positioned on the axially opposite end 16A and the clevis joint 30 positioned on the axially opposite end 16B.

In one embodiment, as shown in FIGS. 5A-B and 9A-E, the buckling initiating feature 18 is an axially extending surface depression having a substantially flat base portion. In one embodiment, the surface depression 18 extends axially along 10% to 50% of the length of the elongate body. The surface depression 18 is positioned along a portion of the generally cylindrical outer surface 22A defined by the arc J-J, as shown in FIG. 9A. The present invention is not limited in this regard however, as the surface depression may be positioned along any suitable portion of the generally cylindrical outer surface 22A, for example along the generally cylindrical outer surface portion defined by the arc J'-J', as shown in FIG. 9E.

Figure 10A:
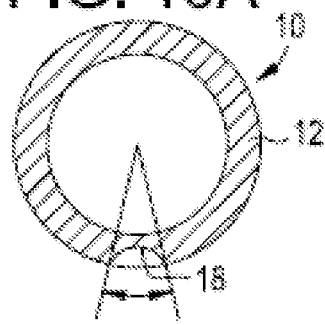
FIG. 10A is a transverse cross sectional view of the compression rod of FIG. 6A cut across the line X'-X' of FIG. 10C.
Figure 10B:
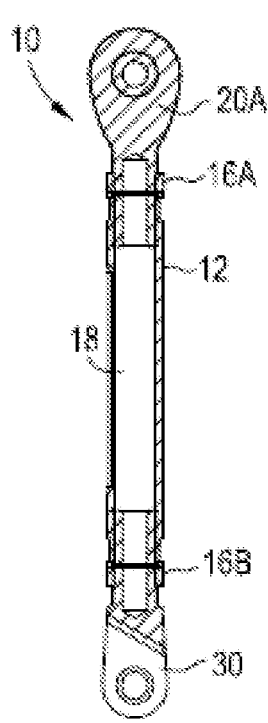
FIG. 10B is a longitudinal cross sectional view of the compression rod of FIG. 6A cut across the line X-X of FIG. 10C.
Figure 10C:
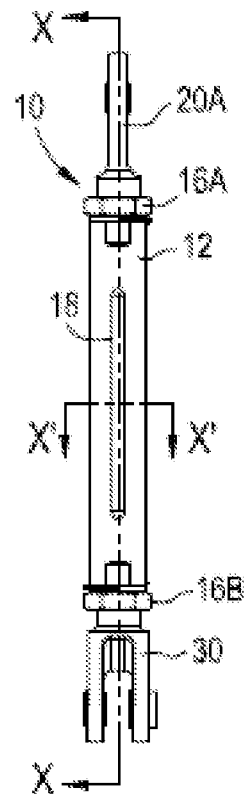
FIG. 10C is a front view of the compression rod of FIG. 6A.
Figure 10D:
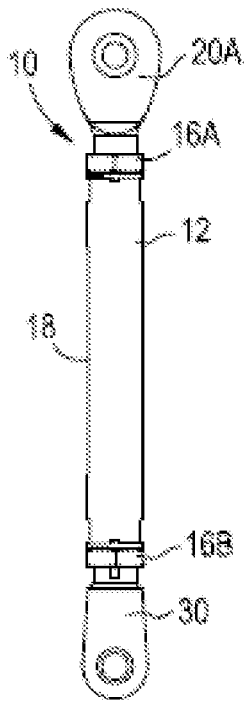
FIG. 10D is a side view of the compression rod of FIG. 6A.
Figure 10E:
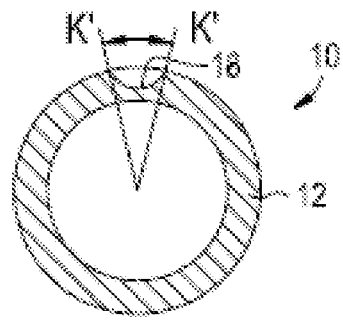
FIG. 10E is a transverse cross sectional view of the compression rod of FIG. 6A cut across the line X'-X' of FIG. 10C, wherein the buckling initiation feature is in an alternative position.

In one embodiment, as shown in FIGS. 6A-B and 10A-E, the buckling initiating feature 18 is an axially extending surface depression having a substantially concave base portion. In one embodiment, the surface depression 18 extends axially along 10% to 50% of the length of the elongate body. The surface depression 18 is positioned along a portion of the generally cylindrical outer surface 22A defined by the arc K-K. The present invention is not limited in this regard however, as the surface depression may be positioned along any suitable portion of the generally cylindrical outer surface 22A, for example along the generally cylindrical outer surface portion defined by the arc K'-K', as shown in FIG. 10E.

Figure 11A:
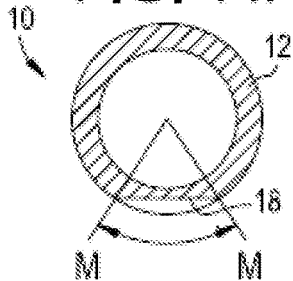
FIG. 11A is a transverse cross sectional view of the compression rod of FIG. 7A cut across the line Y'-Y' of FIG. 11C.
Figure 11B:
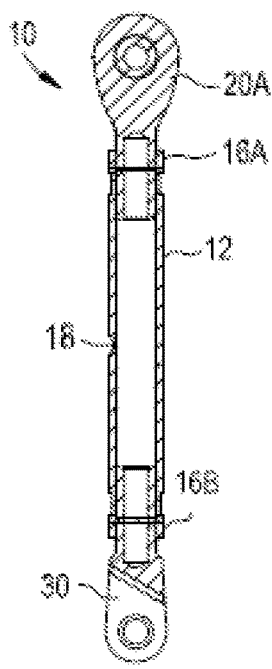
FIG. 11B is a longitudinal cross sectional view of the compression rod of FIG. 7A cut across the line Y-Y of FIG. 11C.
Figure 11C:
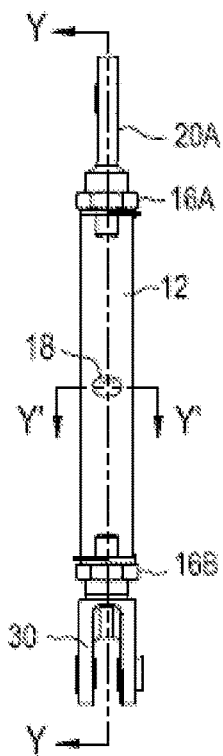
FIG. 11C is a front view of the compression rod of FIG. 7A.
Figure 11D:
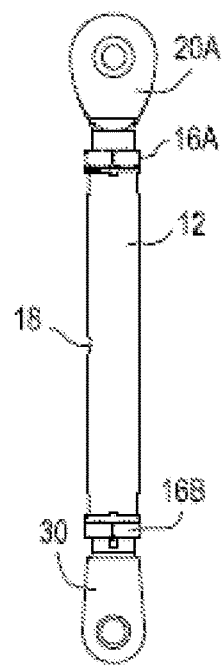
FIG. 11D is a side view of the compression rod of FIG. 7A.
Figure 11E:
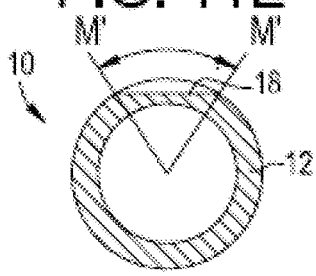
FIG. 11E is a transverse cross sectional view of the compression rod of FIG. 7A cut across the line Y'-Y' of FIG. 11C, wherein the buckling initiating feature is in an alternative position.
Figure 12A:
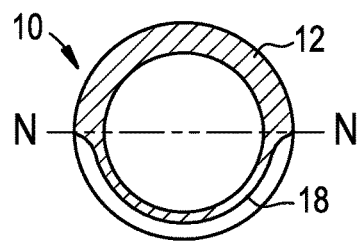
FIG. 12A is a transverse cross sectional view of the compression rod of FIG. 8A cut across the line Z'-Z' of FIG. 12C.
Figure 12B:
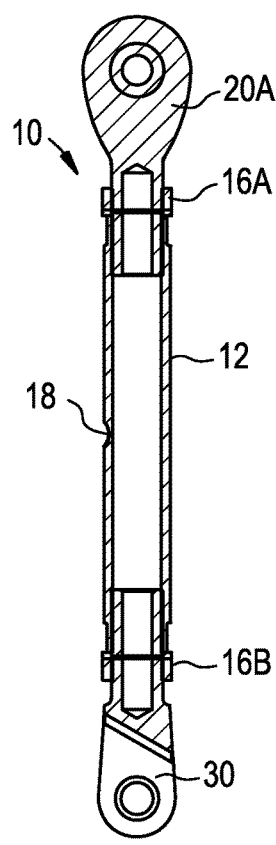
FIG. 12B is a longitudinal cross sectional view of the compression rod of FIG. 8A cut across the line Z-Z of FIG. 12C.
Figure 12C:
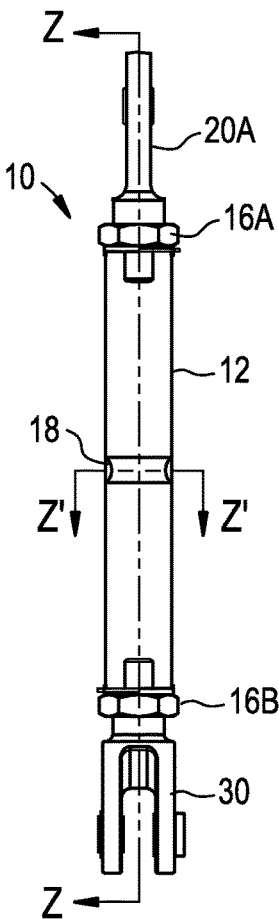
FIG. 12C is a front view of the compression rod of FIG. 8A.
Figure 12D:
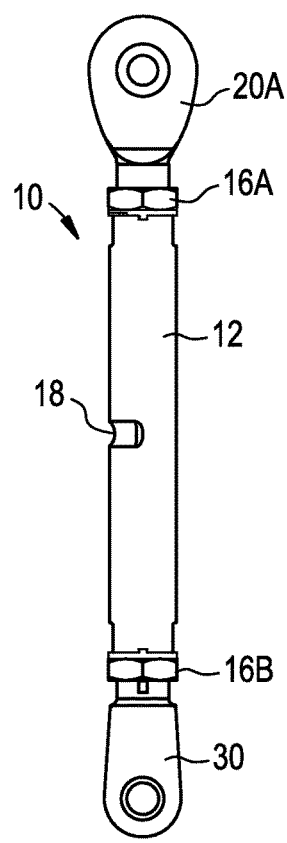
FIG. 12D is a side view of the compression rod of FIG. 8A.
Figure 12E:
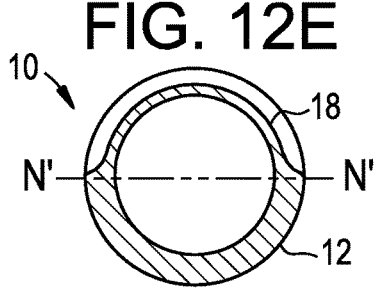
FIG. 12E is a transverse cross sectional view of the compression rod of FIG. 8A cut across the line Z'-Z' of FIG. 12C, wherein the buckling initiation feature is in an alternative position.

In one embodiment, as shown in FIGS. 7A-B and 11A-E, the buckling initiating feature 18 is a transversely extending surface depression having a substantially concave base portion. In one embodiment, the surface depression 18 extends transversely along the length of the elongate body. The surface depression 18 is positioned along a portion of the generally cylindrical outer surface 22A defined by the arc M-M. The present invention is not limited in this regard however, as the surface depression may be positioned along any suitable portion of the generally cylindrical outer surface 22A, for example along the generally cylindrical outer surface portion defined by the arc M'-M', as shown in FIG. 11E.

In one embodiment, as shown in FIGS. 8A-B and 12A-E, the buckling initiating feature 18 is a partially circumferentially extending surface depression having a substantially concave base portion. In one embodiment, the surface depression 18 extends axially along the length of the elongate body. The surface depression 18 is positioned along a portion of the generally cylindrical outer surface 22A defined by the arc N-N. The present invention is not limited in this regard however, as the surface depression may be positioned along any suitable portion of the generally cylindrical outer surface 22A, for example along the generally cylindrical outer surface portion defined by the arc N'-N', as shown in FIG. 11E. In one embodiment, as shown in FIGS. 12A-12E, the surface depression 18 extends approximately 180 degrees around the generally cylindrical outer surface 22A. The present invention is not limited in this regard however, as the surface depression 18 may extend around the generally cylindrical outer surface 22A at any suitable angle without departure from the broader aspects of the present invention.

Figure 13:
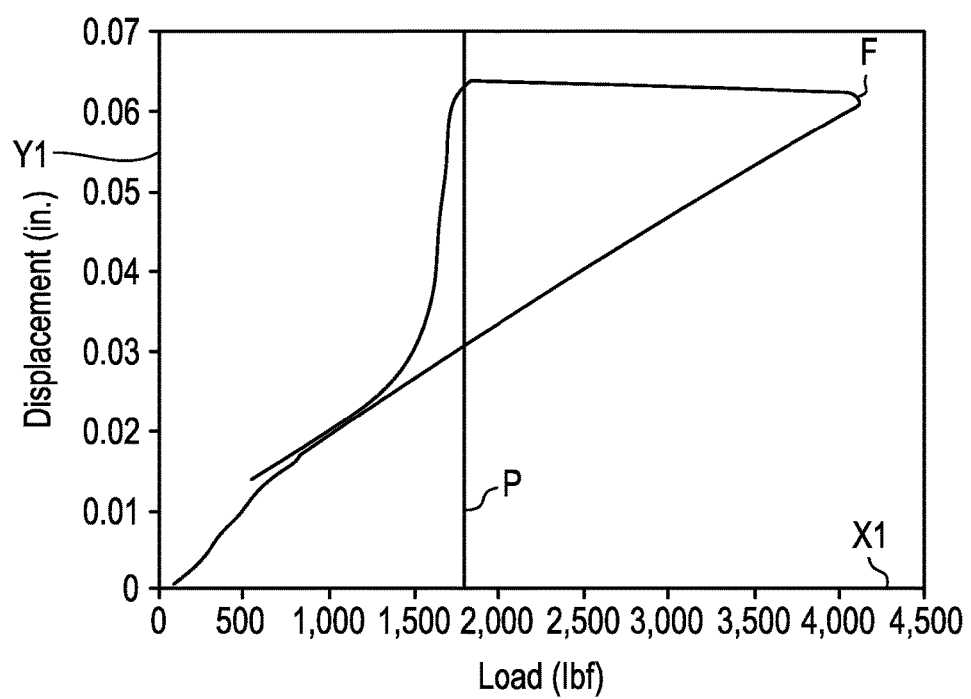
FIG. 13 is a graph of deformation of a typical compression rod in relation to a force applied to the typical compression rod.

With reference to FIG. 13, one embodiment of a graph of displacement in inches in relation to force in lbs for a typical compression rod including rod ends with frictional bearings to which an axially oriented compressive force is applied is shown. An x-axis X1 shows a force applied to the typical compression rod. A y-axis Y1 shows a displacement of the typical compression rod. In one embodiment, the typical compression rod has a slenderness ratio between 90 and 100. The load at which the ideal compression rod with frictionless ends was predicted to fail P is approximately 1800 lbf. The failure load F that a compression rod without the buckling initiating feature 18 and with frictional bearings ranged from 1800 lbf to 4400 lbf.

Figure 14:
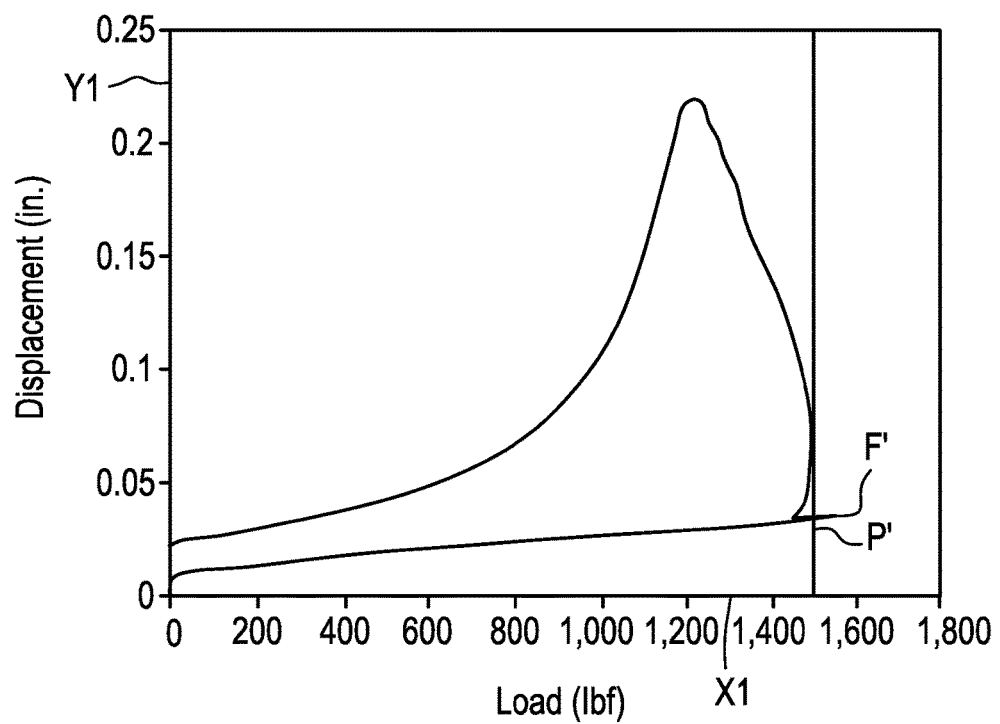
FIG. 14 is a graph of deformation of the compression rod of the present invention in relation to a force applied to the compression rod of the present invention.

With reference to FIG. 14, one embodiment of a graph of displacement in inches in relation to force in lbs of the compression rod of the present invention 10 to which an axially oriented compressive force is applied is shown. An x-axis X1 shows a force applied to the compression rod of the present invention 10. A y-axis Y1 shows a displacement of the compression rod of the present invention. In one embodiment, the compression rod of the present invention 10 has a baseline slenderness ratio between 90 and 100. The failure load P that the compression rod of the present invention, with frictionless ends, 10 was predicted to fail at is approximately 1500 lbf. The load that the compression rod of the present invention failed at F was consistently within 5% of the predicted failure load P. In one embodiment, the buckling initiating feature 18 of the compression rod of the present invention 10 included a surface depression having a substantially flat, axially extending base portion and a depth of 0.05 inches.

Although in one embodiment, the buckling initiating feature 18 includes a surface depression having a substantially flat, axially extending base portion and a depth of 0.05 inches, the present invention is not limited in this regard, as any suitable depth of the surface depression and any suitable configuration of surface depression may be used.

Although the present invention has been disclosed and described with reference to certain embodiments thereof, it should be noted that other variations and modifications may be made, and it is intended that the following claims cover the variations and modifications within the true scope of the invention.

What is claimed is:

1. A compression rod having a buckling initiating feature, the compression rod comprising:
    an elongate body;
    the elongate body having a first cross sectional area along a first a length thereof and a second cross sectional area along a second length thereof; and
    the buckling initiating feature comprising the second cross sectional area, the second cross sectional area being configured to cause predetermined buckling along the elongate body upon application of a predetermined axially oriented compressive force;
    wherein the second cross sectional area causes an eccentricity between:
        a first axially oriented axis along which the predetermined axially oriented compressive force is applied, and
        a second axially oriented axis defined by a centroid of the second cross sectional area;
    wherein the first cross sectional area defines a first outer diameter;
    the compression rod has a slenderness ratio of between 50 and 200;
        wherein the eccentricity is about 3.2 to 4.8% of the first outer diameter; and
        wherein the predetermined axially oriented compressive force is within 5% of an analytically calculated force at which the buckling is predicted to occur when there is no friction on each end of the compression rod.

2. The compression rod of claim 1, wherein the buckling initiation feature is asymmetrically positioned on the elongate body.

3. The compression rod of claim 1, wherein the buckling initiating feature is configured to cause the buckling before plastic axial compression of the elongate body.

4. The compression rod of claim 1, wherein the second cross sectional area is configured to cause the buckling in a direction traverse to a longitudinal axis of the compression rod.

5. The compression rod of claim 1, wherein the elongate body is hollow.

6. The compression rod of claim 1, wherein the buckling initiating feature is positioned substantially equidistant from opposing axial ends of the elongate body.

7. The compression rod of claim 1, wherein the compression rod includes at least one rod end positioned on an axial end of the elongate body.

8. The compression rod of claim 7, wherein at least one of the at least one rod end is threaded into an axial end of the elongate body.

9. The compression rod of claim 1, wherein the buckling initiating feature comprises an axially extending surface depression having a substantially flat base portion.

10. The compression rod of claim 9, wherein the surface depression extends axially along 10% to 50% percent of a length of the elongate body.

11. A compression rod having a buckling initiating feature, the compression rod comprising:

an elongate body;

the elongate body having a first cross sectional area along a first a length thereof and a second cross sectional area along a second length thereof; and the buckling initiating feature comprising the second cross sectional area, the second cross sectional area being configured to cause predetermined buckling along the elongate body upon application of a predetermined axially oriented compressive force;

wherein the second cross sectional area causes an eccentricity between:

a first axially oriented axis along which the predetermined axially oriented compressive force is applied, and a second axially oriented axis defined by a centroid of the second cross sectional area;

wherein the first cross sectional area defines a first outer diameter;

the compression rod has a slenderness ratio of between 50 and 200.

* * * * *